Patented Jan. 14, 1941

2,228,527

UNITED STATES PATENT OFFICE 2,228,527

RECOVERY OF OIL FROM SPENT METAL HALIDE CATALYST MASSES

Rudolf Herman Mettivier Meyer, Amsterdam, Netherlands, assignor to Shell Development Company, San Francisco, Calif., a corporation of Delaware No Drawing. Application August 25, 1939, Serial No. 291,938. In the Netherlands September 1, 1938

10 Claims. (Cl. 196—148)

This invention relates to a process for the recovery of oils from spent catalyst masses obtained in the treatment of hydrocarbons with metal halides, by heating said masses with water and thereafter filtering, whereby the filtrate is separated into an oil and a water phase.

It is a purpose of this invention to reduce the cost of recovering the entrained oils from spent catalyst masses or sludges by the elimination of the expanse of chemical treatment of said residues to recover the oil therefrom. Another object of the invention is to improve the quality of oils so recovered by dissolving in water the metallic halide impurities contained in the oil. It is a further purpose to recover efficiently and completely said oils from stable emulsions which are formed when said oil-bearing sludges are decomposed with water.

It is known that valuable oils are contained in the sludges obtained in the treatment of hydrocarbons, such as mineral oils, tar oils, normally gaseous or liquid olefins, etc. with active metallic halides, particularly the Friedel-Crafts catalysts, or with a metal less noble than hydrogen and a halogen hydride. For example such sludges result from the refining, polymerizing, condensing or cracking of hydrocarbons with AlCl₃. It is believed that the oil contained in the sludge is physically entrained or is in the form of complex compounds with the catalyst or both. It is further known that these oils may be recovered by distilling the oil-bearing sludges in a current of nitrogen after the addition of certain basic salts. It is still further known to decompose the sludges with water, thereby freeing the oil constituents. In the last method, however, it was found difficult to separate the oil from the water as highly stable emulsions are formed.

Now in accordance with our invention, we have found that the valuable oils contained in these metal halide sludges may be recovered without the expense or difficulties attendant in the prior art by simply heating the oil-bearing residue to an elevated temperature below the boiling temperature of the water with a volume of water preferably about twice that of the sludge and filtering the resulting stable emulsion through a filter with narrow pores. A filtrate is obtained which readily separates to form an oil and water layer, which is separately withdrawn.

The temperature to which the oil-bearing residue and water are heated should be sufficiently high to readily hydrolyze the sludge but, on the other hand, it is preferable not to employ temperatures high enough to vaporize the water under the conditions of heating because of the accompanying obnoxious liberation of corrosive HCl vapors. Temperatures in the range of 40° C. to just below boiling are convenient and a temperature of about 80° C. is preferred when carrying out the heating at atmospheric pressure. However, in order to more readily decompose the oil-bearing sludge superatmospheric pressures may be employed, thus permitting higher temperatures without vaporizing the water.

The amount of water employed in decomposing the oil sludge residue should be at least equal in volume to said residue and, preferably, not more than four times greater. Smaller amounts than one volume of water are not so effective in decomposing the residues, whereas amounts of water greater than four volumes per volume of oil sludge residue serve only to increase the time of filtering and add little to the effectiveness of the process.

The filter employed should have fine filter pores to effectively break the oil-water emulsion formed in decomposing the oil sludge residue with water. There are many filters that are effective for this purpose, such as paper filters, fine sand filters, cloth filters, filters prepared by depositing on a cloth a cake of a solid filter aid such as diatomaceous earth, etc. Instead of precoating the filter cloth with a filter aid, the filter aid may be added to the emulsion.

It may be advantageous to use an alkaline finely-divided substance to aid filtration, for example, lime. This has the advantage of removing free hydrogen halide acids and thus protecting the apparatus from excessive corrosion.

On the filter is left a quantity of metallic hydroxides formed by decomposition of the metallic halides with water. The metallic halides present in the water layer may, if desired, be recovered therefrom, and converted into metallic hydroxides by precipitation with, e. g. soda, and used for the preparation of mordant solutions, etc.

If an alkaline filter aid is used, a portion of the metallic halide may be decomposed to liberate metal hydroxide which also deposits on the filter.

The following example further illustrates our process:

A vapor phase cracked distillate having a boiling range of 40° C. to 270° C., which was obtained by cracking solid paraffin wax, was polymerized during four hours at 95° C. with 3.5 per cent by weight of AlCl₃. The reaction mixture was centrifuged, and 10% by weight of sludge was obtained. This sludge was heated to 80° C. with double its volume of water and filtered at this temperature through fine filter cloth in a frame filter press. The filtrate separated upon standing into an oil and water layer. About 6% oil calculated on the basis of the cracked distillate was thus recovered. This oil was separated and after the addition of 4% by weight of terrana, was subjected to a vacuum distillation. The distillation yielded a residual oil boiling above 250° C. and amounting to about 4% by weight of the cracked distillate. This oil had a viscosity of 210 sec. at 210° F., a viscosity index of 91.5 and a closed cup flash point of 255° C.

I claim as my invention:

1. In the process of recovering oil from an oil-bearing spent metal halide catalyst mass, the steps comprising heating said catalyst mass with a volume of water at least equal to its own, to a temperature between 40° C. and the boiling temperature of water thereby forming a stable emulsion, filtering said emulsion through a filter thereby producing a filtrate which readily separates into two layers, an oil and a water layer and separating the layers.

2. The process of claim 1 in which the temperature is 80° C.

3. The process of claim 1 in which 1 to 4 volumes of water are employed per volume of oil-bearing catalyst mass.

4. The process of claim 1 in which about 2 volumes of water are employed per volume of oil-bearing catalyst mass.

5. In the process of recovering oil from an oil-bearing metal halide sludge, the steps comprising heating said sludge with a volume of water at least equal to its own, to a temperature between 40° C. and the boiling temperature of water thereby forming a stable emulsion containing metal hydroxide, filtering said emulsion to remove the metal hydroxide thereby producing a filtrate which readily separates into two layers, an oil and a water layer and separating the layers.

6. In the process of recovering oil from an oil-bearing spent metal halide catalyst mass, the steps comprising heating said catalyst mass with a volume of water at least equal to its own, to a temperature between 40° C. and the boiling temperature of water thereby forming a stable emulsion, filtering said emulsion in the presence of a filter aid and through a filter thereby producing a filtrate which readily separates into two layers, an oil and a water layer and separating the layers.

7. The process of claim 6 in which the filter aid is a finely divided alkaline substance.

8. The process of claim 6 in which the filter aid is lime.

9. In the process of recovering oil from an oil-bearing $AlCl_3$ sludge, the steps comprising heating said sludge with from 1 to 4 volumes of water per volume of sludge to a temperature between 40° C. and the boiling temperature of water thereby forming a stable emulsion containing aluminum hydroxide, filtering said emulsion to remove the aluminum hydroxide thereby producing a filtrate which readily separates into two layers, an oil and a water layer and separating the layers.

10. In the process of recovering oil from an oil-bearing spent metal halide catalyst mass, the steps comprising heating said catalyst mass with a volume of water at least equal to its own, to a temperature in excess of 100° C. and under sufficient pressure to maintain the water in liquid phase thereby forming a stable emulsion, filtering said emulsion through a filter thereby producing a filtrate which readily separates into two layers, an oil and a water layer and separating the layers.

RUDOLF HERMAN METTIVIER MEYER.